(12) United States Patent
Nakamura et al.

(10) Patent No.: US 8,184,509 B2
(45) Date of Patent: May 22, 2012

(54) OPTICAL PICKUP DEVICE AND OPTICAL DISK DEVICE USING THE SAME

(75) Inventors: Toshiteru Nakamura, Yokohama (JP);
Nobuo Nakai, Yokohama (JP);
Shigeharu Kimura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/760,592

(22) Filed: Apr. 15, 2010

(65) Prior Publication Data
US 2011/0051574 A1  Mar. 3, 2011

(30) Foreign Application Priority Data
Sep. 2, 2009 (JP) .................. 2009-202188

(51) Int. Cl.
*G11B 7/00* (2006.01)
*G11B 27/36* (2006.01)
*G11B 7/135* (2006.01)

(52) U.S. Cl. ............. 369/44.23; 369/109.01; 369/53.23; 369/112.03

(58) Field of Classification Search ............... 369/44.23, 369/109.01, 53.23, 53.28, 54, 44.41, 53.22, 369/53.27, 109.02, 110.02, 112.03, 112.04, 369/112.07, 112.12
See application file for complete search history.

(56) References Cited

U.S. PATENT DOCUMENTS

| 2006/0187778 A1* | 8/2006 | Kaji et al. ................. 369/44.41 |
| 2008/0062825 A1* | 3/2008 | Arai et al. ................. 369/44.14 |
| 2008/0093569 A1* | 4/2008 | Kamisada et al. ............. 250/552 |
| 2008/0198730 A1* | 8/2008 | Mori et al. ............... 369/112.23 |
| 2009/0034394 A1* | 2/2009 | Nishimoto et al. ........... 369/103 |

FOREIGN PATENT DOCUMENTS

| JP | 2004-281026 | 10/2004 |
| JP | 2006-344344 | 12/2006 |
| JP | 2006-344380 | 12/2006 |
| JP | 2008-102998 | 5/2008 |

OTHER PUBLICATIONS

Kousei Sano et al.; Novel One-beam Tracking Detection Method for Dual-Layer Blu-ray Discs, IEICE Technical Report, CPM2005-149 (Oct. 2005), Published by The Institute of Electronics, Information and Communication Engineers, email: sano.kouse@jp.panasonic.com.

* cited by examiner

*Primary Examiner* — Joseph Feild
*Assistant Examiner* — Aneeta Yodichkas
(74) *Attorney, Agent, or Firm* — Antonelli, Terry, Stout & Kraus, LLP.

(57) ABSTRACT

Of the beams reflected by an optical disk, only peripheral beams excluding the push-pull region are used to generate a DPD signal in order to optimize internal wire connections among the light receiving areas of the optical detector and thereby reduce the amplification factor of the lens error signal, required for generating the tracking error signal of the DPP method. A beam reflected from a multilayered optical disk is divided into some beam diffraction areas. The divided beam diffraction areas and the light receiving areas are so arranged that the divided beams focus at different positions on the optical detector and that, when a beam is focused on a target recording layer of the disk, stray light from other than the target recording layer being reproduced does not enter into the servo signal light receiving area of the optical detector.

13 Claims, 12 Drawing Sheets

OPTICAL PICKUP DEVICE AND OPTICAL DISK DEVICE USING THE SAME

INCORPORATION BY REFERENCE

The present application claims priority from Japanese application JP 2009-202188 filed on Sep. 2, 2009, the content of which is hereby incorporated by reference into this application.

BACKGROUND OF THE INVENTION

This invention relates to an optical pickup device and an optical disk device.

As an example of background art in the technical field of the invention, JP-A-2006-344344 is cited here. This patent document is described to seek to "retrieve a desired signal with high precision from an optical disk having a plurality of recording layers". Another example is JP-A-2006-344380. This patent document is described to seek to "detect a tracking error signal with little offset even when an optical storage medium having two information recording planes is used. Further, in Technical Report CPM2005-149 (2005-10) published by The Institute of Electronics, Information and Communication Engineers, it is described that "a tracking photo-detector is placed in an area free of stray light from other layers". Its construction is disclosed also in JP-A-2004-281026.

Still another example of background art is JP-A-2008-102998. In this patent document it is described that "individual areas of a beam divider and a light receiving part of an optical detector are arranged so that when a target information recording layer on an optical disk is placed in focus, a light beam reflected from the target information recording layer focuses on the light receiving part of the optical detector and light beams reflected from other information recording layers are not thrown onto the light receiving part of the optical detector."

SUMMARY OF THE INVENTION

A problem has come to be known in recent years that, during recording or reproducing of an optical disk with multiple recording layers, stray light reflected from a recording layer not being reproduced enters an optical detector surface to become disturbances which fluctuate a detection signal of the optical detector. Particularly in optical disks with three or more recording layers, since undesired light fluxes occur in a plurality of layers, disturbance components increase, making variations in the detected signal even larger. To cope with this problem, the patent document JP-A-2008-102998 uses a beam divider having a plurality of areas which divides a beam reflected from the optical disk into a plurality of light beams coming out in different directions, thereby separating the signal light from the stray light to minimize variations in the detection signal.

However, in this construction some devices require a 10-times amplification of a signal used in a DPP (Differential Push-Pull) type tracking error signal, in which case the detection signal cannot be separated completely, significantly amplifying signal fluctuation components generated by a small residual stray beam and disturbance components such as scratches and smears. As a result, the amplified disturbance components leak into the DPP signal, making a stable, high-quality recording or reproduction difficult.

It is an object of this invention to provide an optical pickup device and an optical disk device which can generate a DPP signal while minimizing electric signal amplifications, greatly reduce disturbances leaking into the detection signal and thereby realize a stable, high-quality recording or reproducing.

The object can be achieved, for example, by the invention as defined in the scope of claim.

With this invention it is possible to provide an optical pickup device and an optical disk device which can reduce effects of disturbances caused by stray light leaking into a detection signal and make a high-quality signal detection.

Other objects, features and advantages of the invention will become apparent from the following description of the embodiments of the invention taken in conjunction with the accompanying drawings.

DESCRIPTION OF THE EMBODIMENTS

Figure 1:
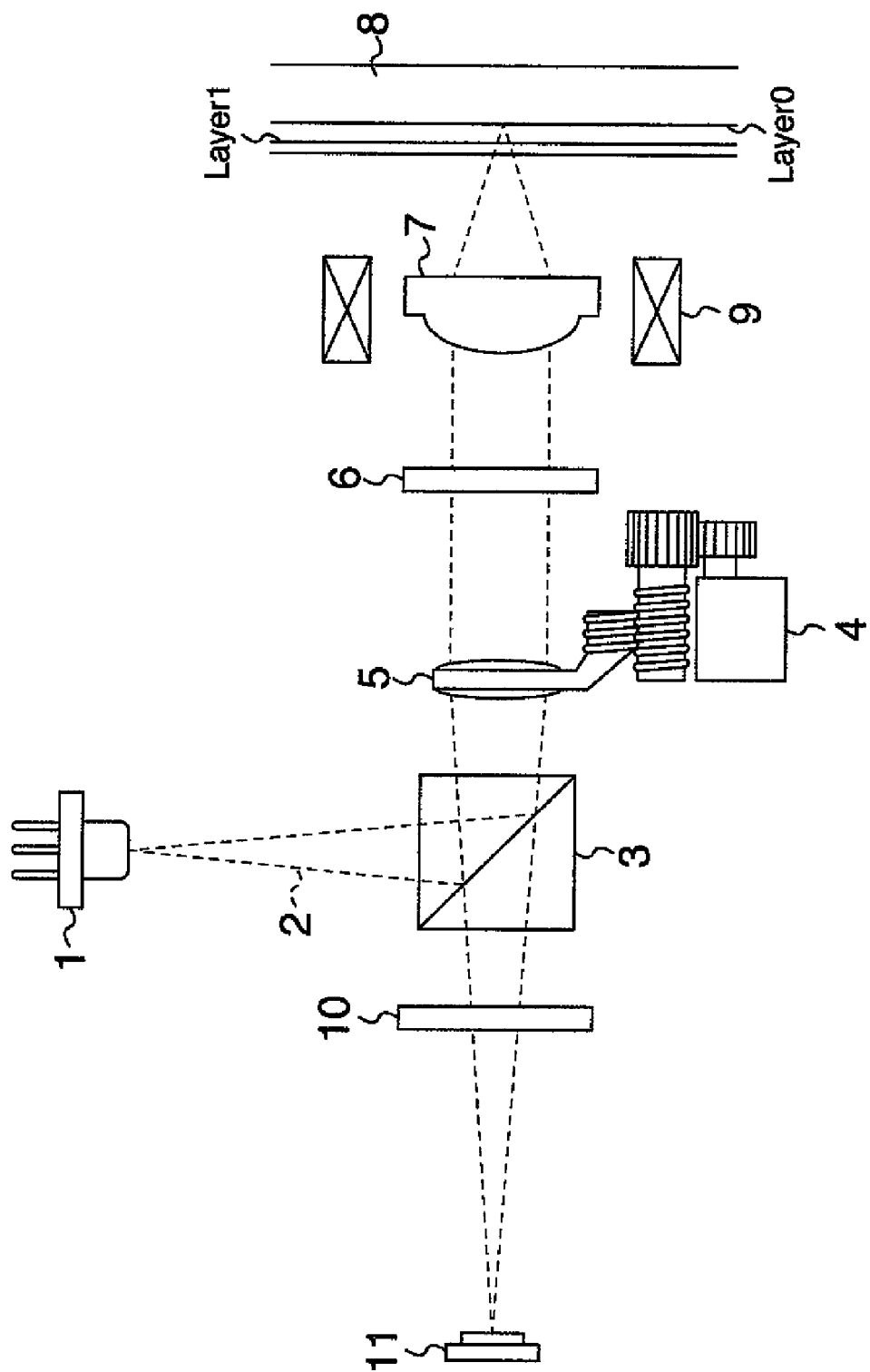
FIG. 1 is a schematic diagram showing an example construction of an optical pickup device according to the invention.

Details of the embodiments of this invention will be explained by referring to the drawings. In the drawings constitutional elements having identical functions are given like reference numerals.

[Embodiment 1]

FIG. 1 schematically shows a construction of one example of an optical pickup device in a first embodiment of this invention. A laser beam 2 emitted from a laser light source 1 is changed in its direction by a polarizing beam splitter 3, passes through a collimator lens 5, which can correct a spherical aberration of an incoming beam by driving a stepping motor 4, and a quarter waveplate 6, which gives a 90-degree phase difference to polarizing components crossing at right angles, and then is focused by an object lens 7 onto a desired recording layer in an optical disk 8.

A beam reflected from the optical disk 8 passes through the object lens 7, the quarter waveplate 6 and the polarizing beam splitter 3 and is divided by a beam divider 10 into a plurality of beams which enter an optical detector 11. The object lens 7 is preferably installed in an actuator 9 that drives it in a desired direction. This actuator is driven to control the position of the object lens. The object lens position control includes a tracking control using a tracking error signal and a focus control using a focus error signal. As the spherical aberration correction unit a liquid crystal device may be used.

Figure 2A:
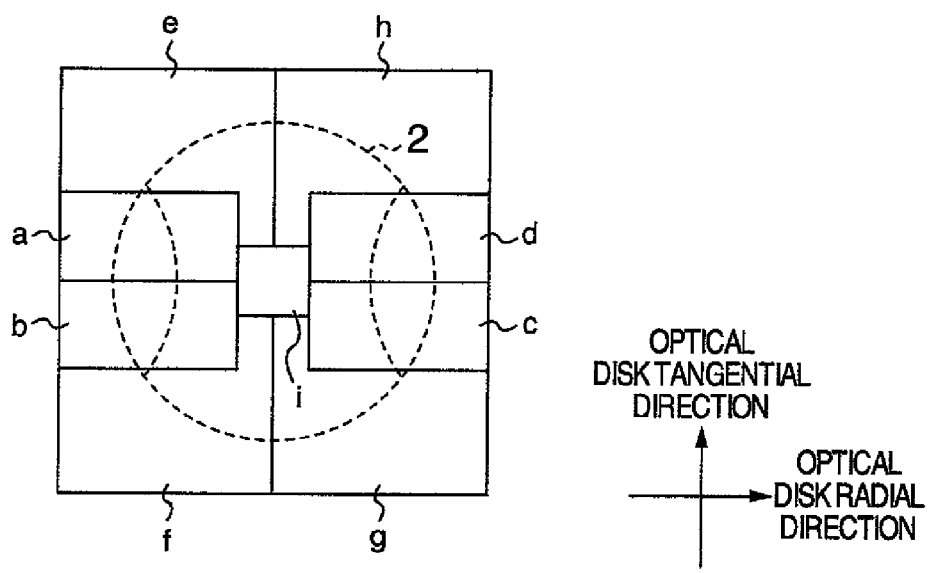
FIGS. 2A and 2B are schematic views of a conventional beam divider.
Figure 2B:
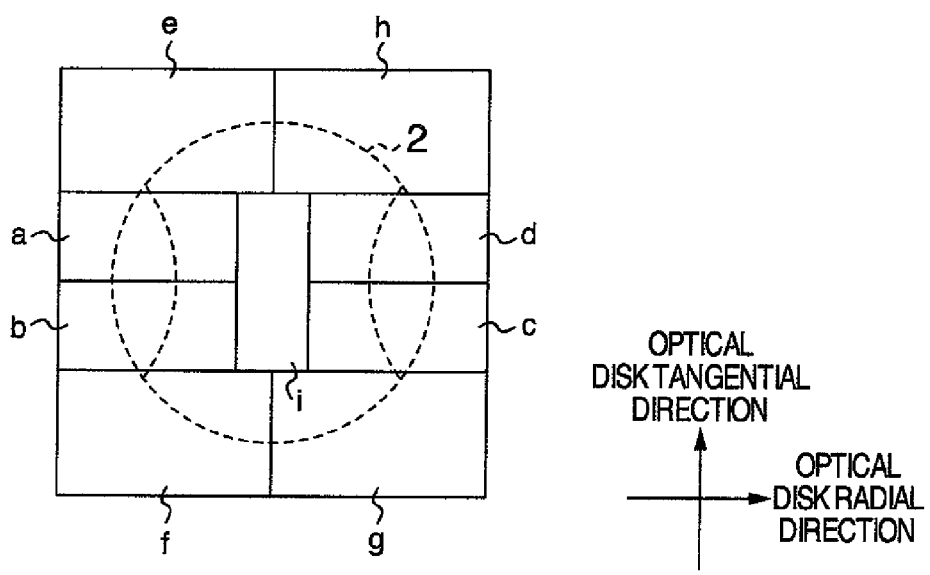

This construction mainly employs an optical system commonly used for recording or reproducing of multilayered optical disks. First, detailed descriptions will be given of the construction of the conventional beam divider and optical detector and their problems. FIG. 2A shows an example outline geometry of the conventional beam divider 10. The beam divider is a diffraction grating, which may have its grating surface divided into a plurality of areas each formed with a predetermined diffraction grating groove. The beam divider is provided with a plurality of diffraction areas a to i. The beam reflected from the optical disk is diffracted by track grooves formed in the recording layer of the optical disk. Of the disk-diffracted light, a 0-th order disk-diffracted light including the center of the beam enters into the diffraction area i; 0-th order and +1st order disk-diffracted light enter into the diffraction areas a and b; and 0-th order and −1st order disk-diffracted light enter into the diffraction areas c and d. Further, a diffraction area e is provided adjacent to the diffraction area a; a diffraction area f is provided adjacent to the diffraction area b; a diffraction area g is provided adjacent to the diffraction area c; and a diffraction area h is provided adjacent to the diffraction area d. The diffraction areas e to h receive light mainly of a circumferential region of the 0-th order disk-diffracted beam. These diffraction areas may be modified in geometry, or desired areas may be integrated or further divided as long as they are within a range conforming to the existing relationship described above between the incident beam components and the diffraction areas. FIG. 2B shows an example variation of the beam divider. It maintains the existing relationship between the respective diffraction areas and the incoming disk-diffracted light.

The beams entering the diffraction areas a to d, which include ±1st order disk-diffracted light from the disk grooves, have a push-pull (referred to as PP) signal component necessary for generating a tracking error signal. From the PP signal a relative position relationship between the disk groove and a focused spot can be known. Beams in the diffraction areas e to h include a lens error signal component required for generating the tracking error signal. The lens error signal is proportional to a distance that the object lens mounted on the actuator is moved.

Figure 3A:
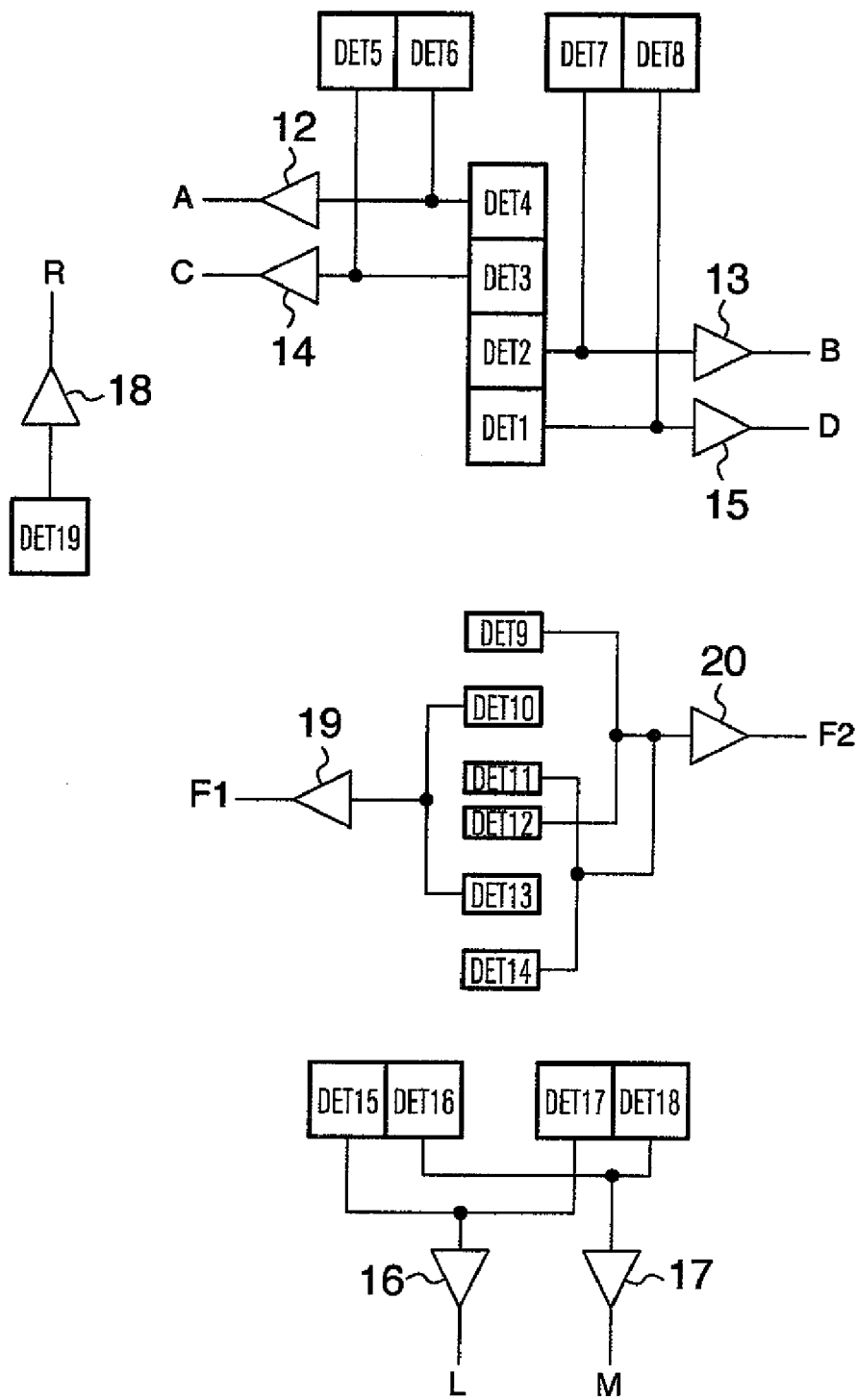
FIGS. 3A and 3B are schematic views showing a construction of a conventional optical detector.
Figure 3B:
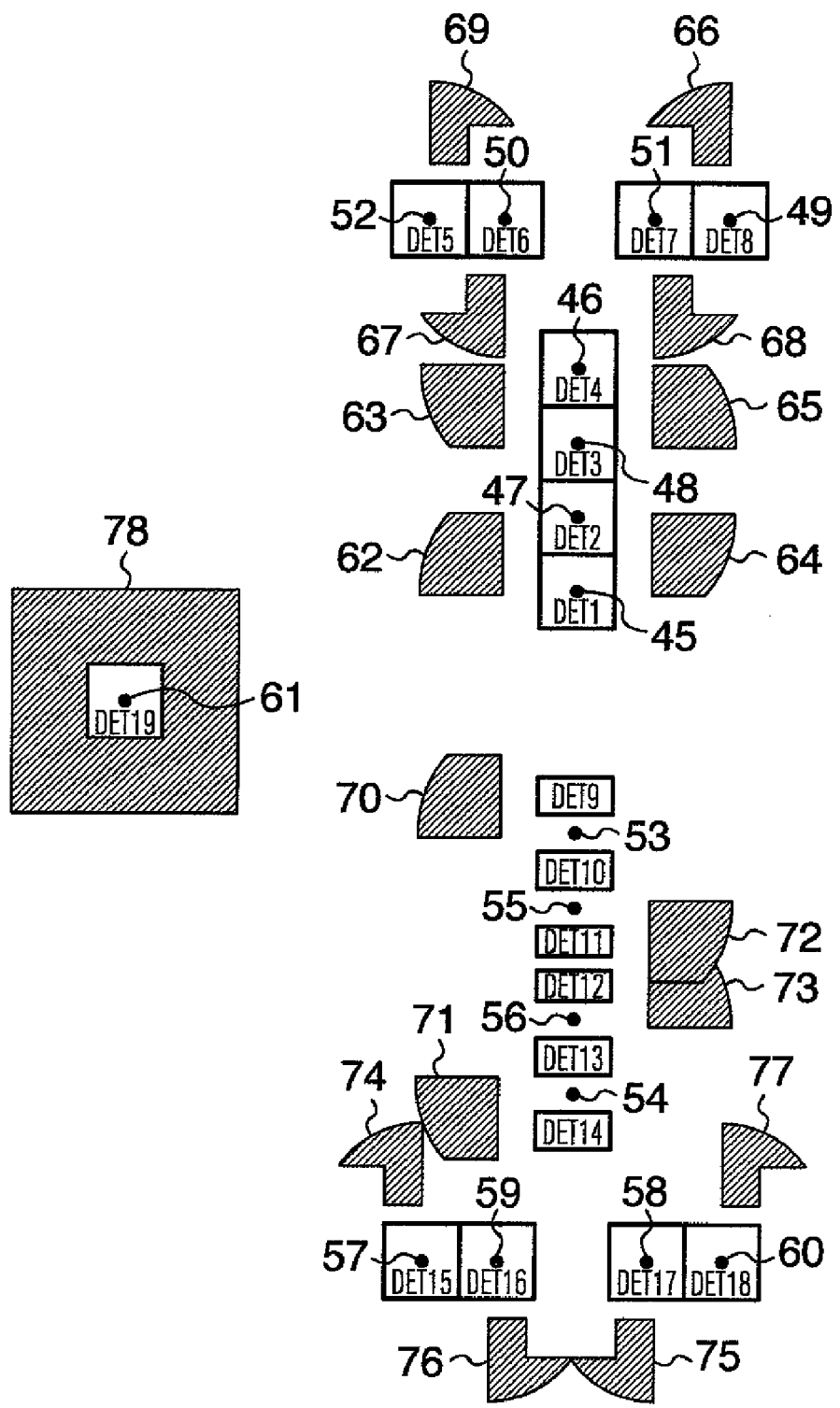

The +1st order light and −1st order light diffracted in respective areas are focused on and enter into a plurality of light receiving areas provided in the optical detector 11 where they are detected. FIG. 3A is a schematic diagram showing a light receiving area pattern of the conventional optical detector 11 and its signal wiring. FIG. 3B shows a light intensity distribution on the optical detector surface of a signal beam reflected from a recording layer being recorded or reproduced and reflected light from other layers not being recorded or reproduced (referred to as stray light) when a multilayered disk is recorded or reproduced. Of the beams that have passed through the diffraction areas a, b, c, d, e, f, g, h, i, +1st order light enters light receiving areas DET1, 4, 2, 3, 8, 6, 7, 5, 19 respectively to form focused spots 45, 46, 47, 48, 49, 50, 51, 52, 61. The −1st order light of the beams that have passed through the diffraction areas e, f, g, h enters light receiving areas DET15, 17, 16, 18 respectively to form focused spots 57, 58, 59, 60. The −1st order light of the beams that have passed through the diffraction areas a, b, c, d enters light receiving areas DET9 to DET14. It is noted, however, that since a double knife edge method is preferably used for the detection of the focus error signal, the beams do not enter directly into the DET9 to DET14 during the focus control but instead fall between the light receiving areas to form focused spots 53 to 56. The tracking error signal is detected by a widely used differential push-pull method (referred to as a DPP method) and a differential phase detection method (referred to as a DPD method). Stray light reflected by the recording layers not being reproduced is also divided by the beam divider as the signal beam is. Unlike the signal light focused on the optical detector surface, stray light is not focused and has a light intensity distribution in which it is blurred over a certain region. Of the stray light that has passed through the diffraction areas a, b, c, d, e, f, g, h and i, the +1st order light forms spots 62, 63, 64, 65, 66, 67, 68, 69, 78. The −1st order light of stray light that has passed through the diffraction areas e, f, g, h forms spots 74, 75, 76, 77. The −1st order light of stray light that has passed through the diffraction areas a, b, c, d forms spots 70, 71, 72, 73. This prevents stray light from entering into the focused spot on the light receiving surface that is formed by the light from the diffraction area used for the tracking error signal generation. This construction can suppress variations of a detected signal that would otherwise be caused by stray light interfering with the signal light.

If two or more light receiving areas to detect +1st order grating-diffracted light or −1st order grating-diffracted light from the diffraction areas e to h are arrayed almost in line in a direction that nearly matches a radial direction of the optical disk and if two or more light receiving areas to detect +1st order grating-diffracted light or −1st order grating-diffracted light from the diffraction areas a to d are arrayed in a direction that almost matches a tangential direction of the optical disk, then stray light can easily be avoided also when the object lens is shifted.

The detected signal of +1st order light is used to detect the DPD signal and the PP signal, which are used as an information reproducing signal and a tracking error signal. −1st order light is used to detect a focus error signal and a lens error signal. The DPP signal is generated by calculating a formula of (PP signal−k*lens error signal) where k is an amplification factor of an amplifier. More specifically, the following internal connections are made and signal computations are executed to detect various signals.

A signal produced by internally connecting DET4 and DET6 and output through a current-voltage conversion amplifier 12 is taken as A;

a signal produced by internally connecting DET2 and DET7 and output through a current-voltage conversion amplifier 13 is taken as B;

a signal produced by internally connecting DET3 and DET5 and output through a current-voltage conversion amplifier 14 is taken as C;

a signal produced by internally connecting DET1 and DET8 and output through a current-voltage conversion amplifier 15 is taken as D;

a signal produced by internally connecting DET15 and DET17 and output through a current-voltage conversion amplifier 16 is taken as L;

a signal produced by internally connecting DET16 and DET18 and output through a current-voltage conversion amplifier 17 is taken as M;

a signal output from DET19 through a current-voltage conversion amplifier 18 is taken as R;

a signal produced by internally connecting DET10 and DET13 and output through a current-voltage conversion amplifier 19 is taken as F1; and a signal produced by internally connecting DET9 and DET11 and also DET12 and DET14 and output through a current-voltage conversion amplifier 20 is taken as F2.

Performing the following calculations using the above outputs can produce an information reproducing signal and a servo control signal.

PP signal: (A+D)−(B+C)

Lens error signal: L−M

DPP signal: PP signal−k*lens error signal ((A+D)−(B+C)−k*(L−M))

Focus error signal: F1−F2

DPD signal: (phase comparison between A and B)+(phase comparison between C and D)

Information reproducing signal: A+B+C+D+R

The conventional optical detector, rather than providing the current-voltage conversion amplifier for each light receiving area to detect signals, connects the light receiving areas inside the optical detector and then provides the current-voltage conversion amplifier to detect signals, thereby reducing the number of current-voltage conversion amplifiers. This is to secure a necessary S/N ratio for the detection of information reproducing signal. The fewer the number of current-voltage conversion amplifiers, the greater the degree to which the noise components can be suppressed. In the double knife edge method used for the focus detection, background areas in the light receiving surface has a problem of degraded frequency characteristics in the signal detection. It is therefore advised not to use signals from these light receiving areas for the detection of the information reproducing signal. So, the current practice involves setting a light intensity ratio between +1st order light and −1st order light to about 4:1 to give a weight to the +1st order light and performing the detection of a reproducing signal only from the side of +1st order light having a strong light intensity, with the number of current-voltage conversion amplifiers reduced by internal connections. −1st order light with a weak light intensity is used for the detection of a focus error signal. It is therefore common to set the spectral ratio of the diffraction areas in the beam divider to about 0-th order light:+1st light:−1st order light=0:4:1 and use a grating so blazed that the light intensity of +1st order light is greater than that of −1st order light.

In the following the problem of the conventional optical detector will be described. In the conventional optical detector the problem is that the lens error signal has to be detected using −1st order light with a weak light intensity and that the signal, after being detected by the light receiving areas, needs to be greatly amplified electrically by an amplifier with an amplification factor of about k=10. Although the light receiving areas are so arranged geometric-optically as to prevent stray light in a multilayered disk from entering the light receiving areas, it is difficult from the wave optics viewpoint to completely separate stray light and a signal beam, leaving the stray light to have a certain light intensity component in wide ranges. So, there are stray light components, though small in quantity, that enter the light receiving areas. Particularly, in a multilayered optical disk which has a plurality of recording layers separated with a narrow space in between that may produce stray light, the light intensity distribution of stray light on the optical detector surface is very complicated, rendering the complete separation between the stray light and the signal light extremely difficult. As a result, stray light can easily enter into the light receiving areas and become disturbance components to cause variations in a detected signal. In the conventional construction, the signal variation caused by the multilayer stray light is greatly amplified by the amplifier to leak into the DPP signal. Actually, in a multilayered optical disk, the pickup of the conventional construction easily causes variations in the lens error signal detected from −1st order light. Further, besides the signal variations due to the multilayer stray light, disturbances such as caused by scratches and smear, when they leak into the lens error signal, become greatly amplified by the amplifier, significantly degrading the recording or reproducing quality. As described above, the problem of the conventional construction is that the lens error signal is too sensitive to various disturbances.

The lens shift signal component can be detected also from light spots on the side of +1st order light of the diffraction areas e to h. If the signal can be detected from this side, there will be no light intensity difference caused by the spectral ratio, minimizing the amplification factor. Another problem is that light on the side of −1st order light with a weak light intensity is easily affected by fabrication errors of a grating, increasing variations of spectral ratio among different areas of the beam divider. This in turn may cause an offset of the DPP signal, degrading the recording or reproducing quality. It is therefore desired from the standpoint of spectral ratio variations that the DPP signal be generated by using only the light on the side of +1st order light having a strong light intensity. However, to detect the DPD signal, it is necessary to detect four signals —a sum signal of the diffraction areas a and e, a sum signal of the diffraction areas b and f, a sum signal of the diffraction areas c and g, and a sum signal of the diffraction areas d and h. Then, if, without making wire connections to obtain signals required for the generation of PP and DPD signals, all signals are passed through the current-voltage conversion amplifiers for individual detection and generated by computations, nine current-voltage conversion amplifiers will be required for the detection of the information reproducing signal, which greatly degrades the S/N ratio. To avoid this, internal wire connections are made to reduce the number of current-voltage conversion amplifiers to five, realizing both the detection of the PP signal and DPD signal and the detection of low-noise information reproducing signal at the same time. In this arrangement the signal on the +1st order light side of the lens shift signal, that is originally intended to be subtracted from the PP signal during the DPP signal computation, is added to the PP signal. So, the lens error signal cannot be detected from +1st order light, leaving the conventional construction with no alternative but to take the lens error signal from −1st order light that has a small light intensity.

Because the light intensity difference due to the spectral ratio and the lens shift signal component of +1st order light are added to PP, the amplification factor has increased to a very large value of about k=10.

As explained above, in the conventional construction because provisions are made to reduce the number of current-voltage conversion amplifiers in order to detect the DPD signal and secure the S/N ratio, the electrical amplification factor of the lens error signal necessary for the DPP signal generation has become as large as k=10. Under this circumstance, this invention introduces a novel DPD signal detection method that enables the optical pickup device to greatly reduce the amplification factor of the amplifiers required for the generation of the DPD signal to as low as about 1 to 2 and still obtain various signals identical to the conventional ones. As a result an optical pickup device can be provided which is resistant to disturbances, such as multilayer stray light, variations of spectral ratio of grating and scratches, and which has a good yield and can produce a stable, high recording and reproducing quality.

First, the novel DPD signal detection method of this invention will be explained. The conventional DPD method, as described above, uses the almost entire region of a signal beam to detect the DPD signal. This invention focuses on a peripheral region of the signal beam, excluding the PP signal region. That is, it has been examined whether the DPD signal can be detected from only the beam in the peripheral region corresponding to the diffraction areas e to h. The examination has found that a good-quality DPD signal can also be detected from the beams in the peripheral region alone. This is based on the fact that, because the DPD signal is detected not by detecting a light intensity change itself as a signal but by detecting a difference in timing at which the light intensity changes (phase difference) and taking a change in the phase difference as a signal, if the light intensity or a part of the beam region decreases, the signal can be generated as long as the timing of light intensity change can be detected. The new DPD detection method of this invention has shown that the DPD signal detection can be made by using only the signals of DET5, 6, 7, 8 into which a peripheral region beam enters, without having to make internal wire connections between the light receiving areas DET1 and 8, between DET2 and 7, between DET3 and 5, and between DET4 and 6, as has been required by the conventional construction in reducing the number of current-voltage conversion amplifiers. Since the novel DPD detection method of this invention has eliminated the need for the internal wire connections, the use of the signals of DET5, 6, 7, 8 allows for the generation of the lens error signal on the side of +1st order light and also the detection of the DPD signal. This in turn results in a substantial reduction in the amplification factor of the amplifiers to as low as around 1.5.

Figure 4A:
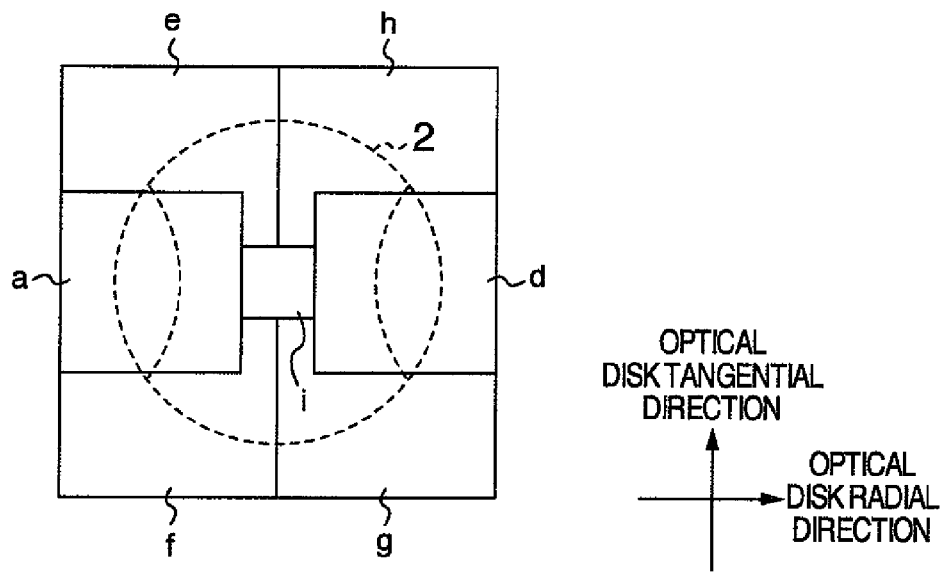
FIGS. 4A and 4B are schematic views showing a beam divider in a first embodiment.
Figure 4B:
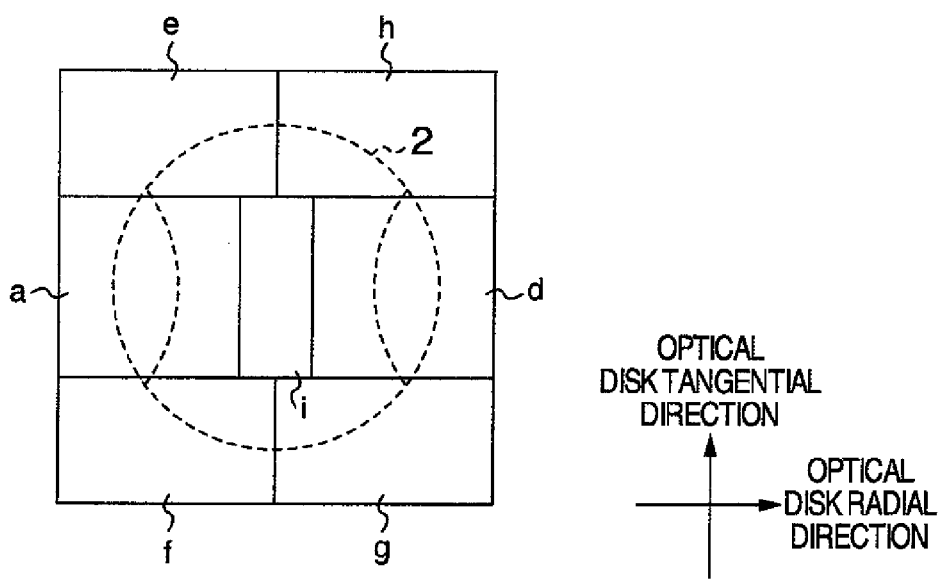
Figure 5:
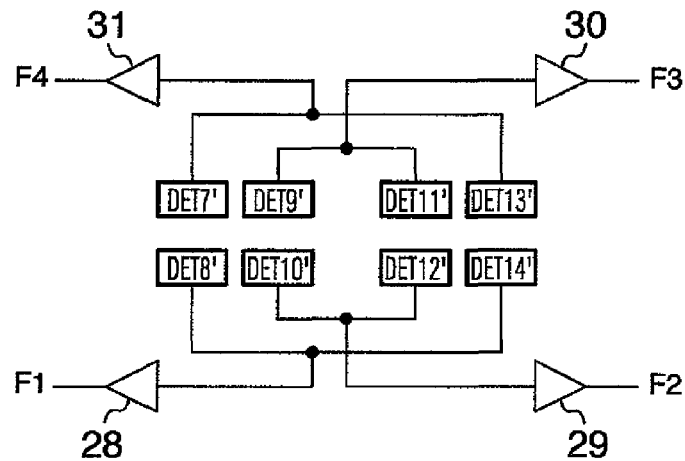
FIG. 5 is a schematic view showing a construction of an optical detector in the first embodiment.
Figure 5:
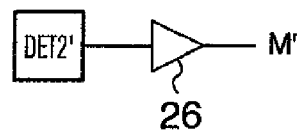
Figure 5:
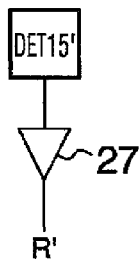
Figure 5:
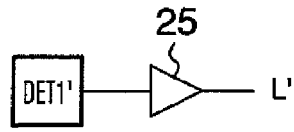
Figure 5:
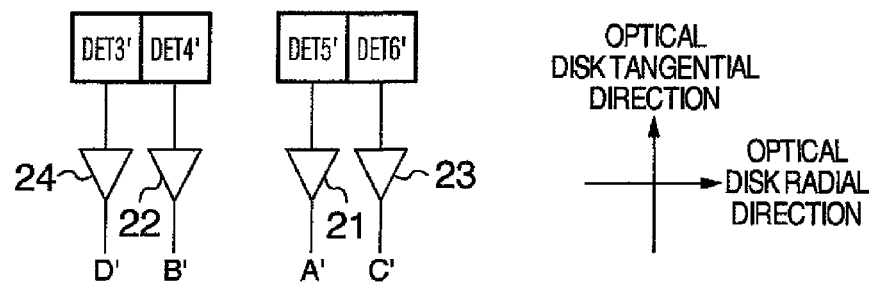

In the following, detailed explanation will be given of the construction of this invention. FIGS. 4A and 4B show an outline construction of the beam divider 10 in this invention. The diffraction areas b, c are integrated with the diffraction areas a, d respectively, though they are within the range of the variation of the conventional example. It is desired that the diffraction areas e, f, g, h be given the similar spectral ratios to those of the conventional example. The diffraction areas a, d need to be assigned the similar spectral ratios to those of the conventional example or spectral ratios that cause the light intensity to concentrate only on +1st order light. The diffraction area i needs to be assigned the similar spectral ratio to that of the conventional example. FIG. 5 is a schematic diagram showing an arrangement of light receiving areas and a method of wire connection in this invention.

Of the beams that have passed through the diffraction areas a, d, e, f, g, h, i, the +1st order light enters DET1', 2', 3', 5', 4', 6', 15' respectively. Of the beams that have passed through the diffraction areas e, f, g, h, the −1st order light enters light receiving areas DET7' to DET14' for focus detection. It is noted, however, that because the double-knife-edge method is desired to be used for the detection of the focus error signal, the signal beam does not enter directly into DET7' to DET14' but between the light receiving areas during the focus control.

Signals are determined by the following calculations.

A signal output from DET5' through a current-voltage conversion amplifier 21 is taken as A';

a signal output from DET4' through a current-voltage conversion amplifier 22 is taken as B';

a signal output from DET6' through a current-voltage conversion amplifier 23 is taken as C';

a signal output from DET3' through a current-voltage conversion amplifier 24 is taken as D';

a signal output from DET1' through a current-voltage conversion amplifier 25 is taken as L';

a signal output from DET2' through a current-voltage conversion amplifier 26 is taken as M';

a signal output from DET15' through a current-voltage conversion amplifier 27 is taken as R';

a signal produced by internally connecting DET8' and DET14' and output through a current-voltage conversion amplifier 28 is taken as F1';

a signal produced by internally connecting DET10' and DET12' and output through a current-voltage conversion amplifier 29 is taken as F2';

a signal produced by internally connecting DET9' and DET11' and output through a current-voltage conversion amplifier 30 is taken as F3'; and a signal produced by internally connecting DET7' and DET13' and output through a current-voltage conversion amplifier 31 is taken as F4'.

Performing the following calculations on the output signals shown above can produce an information reproducing signal and a servo control signal.

PP signal: L'−M'

Lens error signal: (A'+D')−(B'+C')

DPP signal: PP signal−k*lens error signal (L'−M'−k*{(A'+D')−(B'+C')})

Focus error signal: (F1'+F3')−(F2'+F4')

DPD signal: (phase comparison between A' and B')+(phase comparison between C' and D')

Information reproducing signal: A'+B'+C'+D'+L'+M'+R'

Although the number of current-voltage conversion amplifiers is seven, exceeding the conventional five by two, this does not represent a serious degradation, which can be dealt with by improving the performance of the current-voltage conversion amplifiers themselves and optimizing their sensitivity setting. Further, since the number of spots on the optical detector surface is reduced, this arrangement offers an advantage of being able to make the adjustment of the optical detector easy and improve a yield.

The beam divider 10 may be located in the beam's forward and return path between the polarizing beam splitter 3 and the quarter waveplate 6. Since the distance between the optical detector and the beam divider increases, the required grating pitch can be increased, rendering the beam divider easy to fabricate. Further, since this arrangement also increases the effective diameter of the beam on the diffraction grating surface, the degree to which various signals degrade in the event of a positional misalignment of the beam divider is alleviated. To prevent the beam divider from acting on a beam in its forward path, the beam divider is desirably constructed as a polarizing diffraction grating with a polarization so that it acts only on the return beam.

It is desired that the light receiving areas be arranged to conform to the basic construction of the conventional example so that stray light can be avoided easily. So, in one preferred arrangement, two or more light receiving areas to detect +1st order grating-diffracted light or −1st order grating-diffracted light in the diffraction areas e to h may be arrayed almost in line in a direction that nearly matches the radial direction of the optical disk and two or more light receiving areas to detect +1st order grating-diffracted light or −1st order grating-diffracted light in the diffraction areas a to d may be arrayed in a direction that almost matches a tangential direction of the optical disk. Therefore, the arrangement of the light receiving areas is not limited to the one shown in FIG. 5. The positions of the individual light receiving areas may be modified as long as the relationship between the beams from the diffraction areas and the light receiving areas into which they enter remains unchanged. According to the modified arrangement, the diffraction direction and angle of the beam divider need to be changed in order to allow the beams to enter into the corresponding light receiving areas. As for the light receiving areas that detect the focus error signal, since these light receiving areas do not perform detection of the information reproducing signal or any other control signal, changes may be made freely to these areas. For example, not only may the position of the light receiving area pattern be changed, but a new light receiving areas may also be added, internal wire connections changed and output signals and current-voltage conversion amplifiers added.

With the above arrangement, the PP signal and the lens error signal can be detected on the side of +1st order light that has a strong light intensity and the DPD signal can also be detected. It is also possible to detect the lens error signal from the side of +1st order light whose spectral ratio is equal to the PP signal. This can lower the amplification factor of the amplifiers significantly to around 1.5. Therefore an optical pickup device can be provided which is tolerant of various disturbances and variations, such as multilayer stray light interferences and scratches and smear of an optical disk, and which can minimize signal degradations due to spectral ratio variations, assuring a stable, high-quality recording and reproducing.

[Embodiment 2]

A second embodiment will be explained by referring to FIG. 6. This embodiment uses a beam divider which is easier to manufacture than that of the first embodiment in order to minimize variations in the mass production of beam dividers and thereby stabilize the performance of individual beam dividers, which in turn leads to an improved yield and a lower cost of the optical pickup device.

The construction of an optical system of the optical pickup device of this embodiment may, for example, be similar to the optical pickup device shown in FIG. 1. What differs from the first embodiment is the construction of the beam divider 10 and the optical detector 11. So, the construction of the optical detector 11, a main component of the second embodiment, will be explained by referring to FIG. 6.

In the optical system construction of the first embodiment, the diffraction grating tends to have the smallest grating pitch in the diffraction area i. When the grating pitch becomes small, a diffraction efficiency or the like easily changes due to influences of manufacturing errors. This in turn results in variations in the performance of the optical pickup device and a reduction in yield. To deal with this problem, a rectangular grating that makes the light intensities of +1st order light and −1st order light equal is set in only the diffraction area i. The rectangular grating is much easier to manufacture than the blazed grating used in the first embodiment and thus can greatly reduce performance variations. The geometry of individual diffraction areas may be similar to that of the first embodiment.

Figure 6:
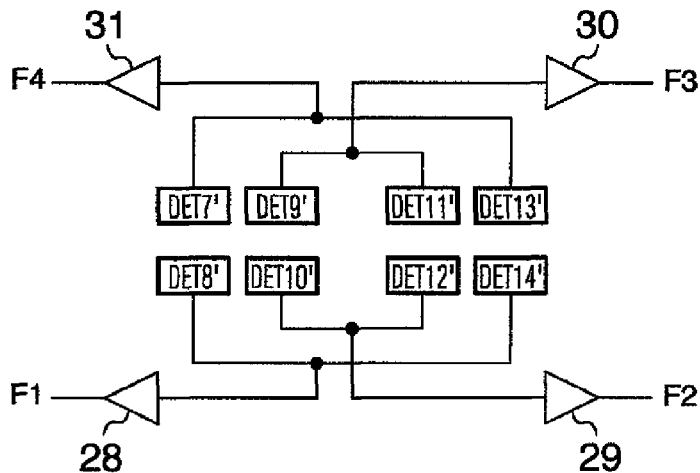
FIG. 6 is a schematic view showing a construction of an optical detector in a second embodiment.
Figure 6:
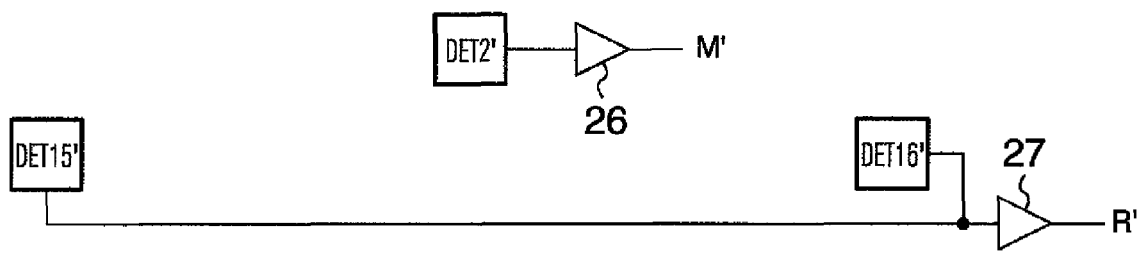
Figure 6:
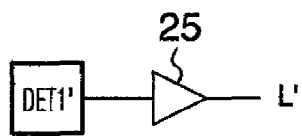
Figure 6:
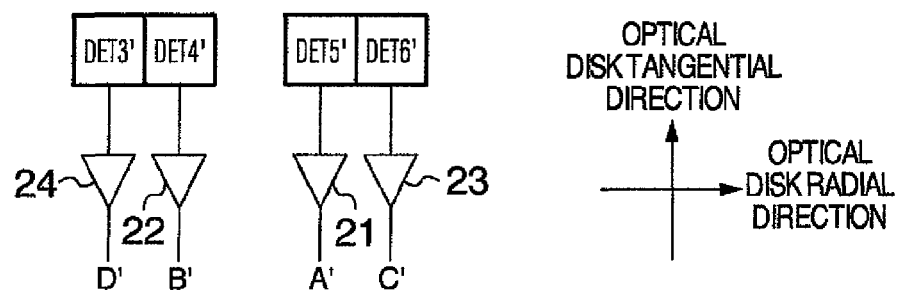

FIG. 6 shows an outline of the optical detector which has a rectangular grating in the diffraction area i. What differs from the first embodiment is the construction of the light receiving area that receives a beam from the diffraction area i and its internal wire connections. Since the rectangular grating in the diffraction area i allots the light intensity evenly to the ±1st order light, the light intensity of +1st order light becomes smaller than that of the first embodiment. Then, an additional DET16' is provided in order to detect −1st order light from the diffraction area i, too, whose light intensity has increased. DET15' and DET16' may be internally connected to produce a signal R' and there will be no increase in the number of current-voltage conversion amplifiers.

The relationship between other diffraction areas and light receiving areas, their internal wire connections and the signal computation method may be similar to those of the first embodiment. More specifically, of the beams that have passed through diffraction areas a, d, e, f, g, h, the +1st order light enters DET1', 2', 3', 5', 4', 6' respectively. Of the beams that have passed through the diffraction areas e, f, g, h, the −1st order light enters into light receiving areas DET7' to DET14' for focus detection. However, since the double-knife-edge method is preferred for the detection of the focus error signal, the signal beams do not enter directly into DET7' to DET14' but instead fall between the light receiving areas. The tracking error signal is detected by the widely used DPP method and DPD method. The +1st order light from the diffraction area i formed with the rectangular diffraction grating enters the light receiving area DET15' and the −1st order light enters the light receiving area DET16'.

These signals are obtained from the following calculations.

A signal output from DET5' through a current-voltage conversion amplifier 21 is taken as A';

a signal output from DET4' through a current-voltage conversion amplifier 22 is taken as B';

a signal output from DET6' through a current-voltage conversion amplifier 23 is taken as C';

a signal output from DET3' through a current-voltage conversion amplifier 24 is taken as D';

a signal output from DET1' through a current-voltage conversion amplifier 25 is taken as L';

a signal output from DET2' through a current-voltage conversion amplifier 26 is taken as M';

a signal produced by internally connecting DET15' and DET16' and output through a current-voltage conversion amplifier 27 is taken as R';

a signal produced by internally connecting DET8' and DET14' and output through a current-voltage conversion amplifier 28 is taken as F1';

a signal produced by internally connecting DET10' and DET12' and output through a current-voltage conversion amplifier 29 is taken as F2';

a signal produced by internally connecting DET9' and DET11' and output through a current-voltage conversion amplifier 30 is taken as F3'; and a signal produced by internally connecting DET7' and DET13' and output through a current-voltage conversion amplifier 31 is taken as F4'.

Performing the following calculations on the output signals shown above can produce an information reproducing signal and a servo control signal.

PP signal: $L'-M'$

Lens error signal: $(A'+D')-(B'+C')$

DPP signal: PP signal$-k*$lens error signal $(L'-M'-k*\{(A'+D')-(B'+C')\})$

Focus error signal: $(F1'+F3')-(F2'+F4')$

DPD signal: (phase comparison between A' and B')+(phase comparison between C' and D')

Information reproducing signal: $A'+B'+C'+D'+L'+M'+R'$

That is, in this embodiment the use of the beam divider, which is easier to fabricate than that of the first embodiment, can minimize variations in mass production of the beam divider, stabilizing the performance of the individual beam dividers, improving the yield, and reducing the cost, of the optical pickup device, realizing a significant reduction of the amplification factor of the amplifiers to as low as around 1.5. This in turn offers an advantage of being able to provide an optical pickup device which is tolerant of disturbances, such as multilayer stray light interferences, has smaller performance variations during mass production than in the first embodiment and thus can produce stable, high-quality recording and reproducing signals.

[Embodiment 3]

Figure 7A:
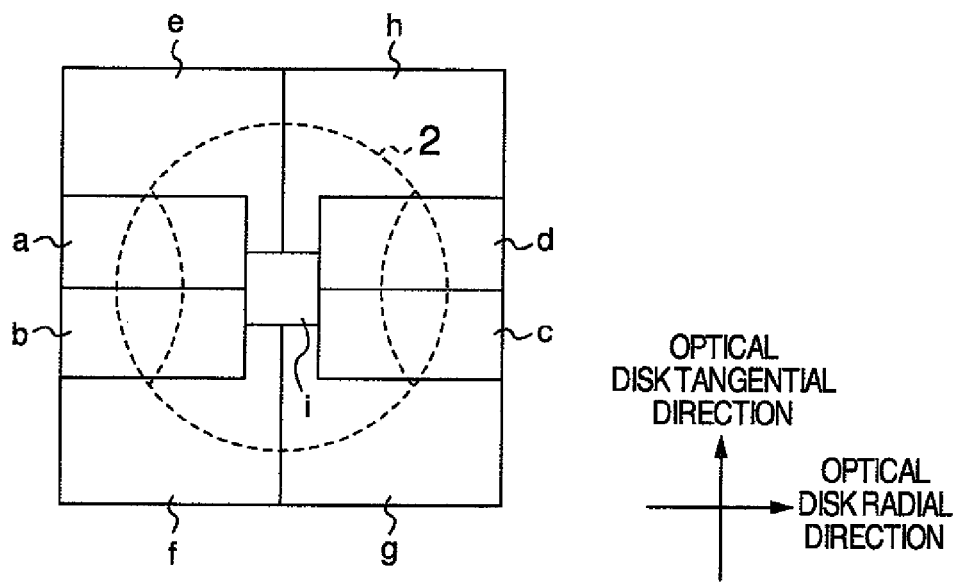
FIGS. 7A and 7B are schematic views showing a beam divider in a third embodiment.
Figure 7B:
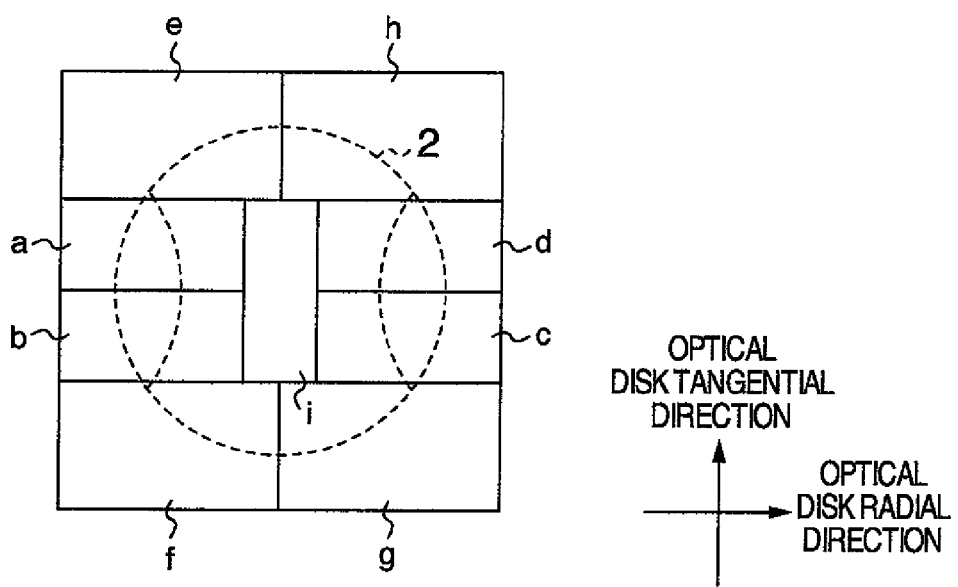

Next, a third embodiment will be described by referring to FIGS. 7A and 7B and FIG. 8. This embodiment provides an optical pickup device which has a smaller number of current-voltage conversion amplifiers for information reproducing signal detection than that of the first embodiment and thus can detect a high-quality information reproducing signal with less noise.

The construction of an optical system of the optical pickup device of this embodiment may, for example, be similar to the optical pickup device shown in FIG. 1. What differs from the first embodiment is the construction of the beam divider 10 and the optical detector 11. So, the constructions of the beam divider 10 and the optical detector 11, the main components of the third embodiment, are shown in FIGS. 7A and 7B and FIG. 8, respectively.

The construction of the beam divider may be similar to that of the conventional beam divider of the first embodiment. The diffraction areas a, b, c, d, e, f, g, h, i are desirably given the similar spectral ratios to those of the conventional example. From +1st order light entering through the diffraction areas a to d a PP signal is detected; from +1st order light entering through the diffraction areas e to h a lens error signal is detected; from −1st order light entering through the diffraction areas e to h the DPD signal is detected; from −1st order light entering through the diffraction areas a to d a focus error signal is detected; and from +1st order light entering through the diffraction areas a to i an information reproducing signal is detected. What is characteristic of the second embodiment is that a new DPD signal that uses peripheral regions of a beam is detected from the side of −1st order light with a weak light intensity. As described above, the DPD signal is a tracking error signal generated by detecting a timing of signal change and determining a phase difference between the signal change timings. This method therefore has an advantage of being able to obtain a precise tracking error signal even if the signal light intensity is weak as long as the signal change timing can be detected. It is more tolerant of disturbances than the DPP signal which is a tracking error signal generated directly from light intensity changes. So, the DPD signal which is taken from the peripheral regions of the beam is detected from −1st order light with a weak light intensity. With this arrangement, since only the PP signal and the lens shift signal need to be produced from the side of +1st order light, the number of current-voltage conversion amplifiers can be reduced to five, equivalent to the amplifier number of the conventional example, by making internal connections between the light receiving areas DET1 and DET4, between DET2 and DET3, between DET5 and DET7 and between DET6 and DET8. As for the lens error signal, since it is detected from +1st order light, the amplification factor of the lens error signal can be reduced to around k=1.5, equivalent to the amplification factor of the first embodiment.

Figure 8:
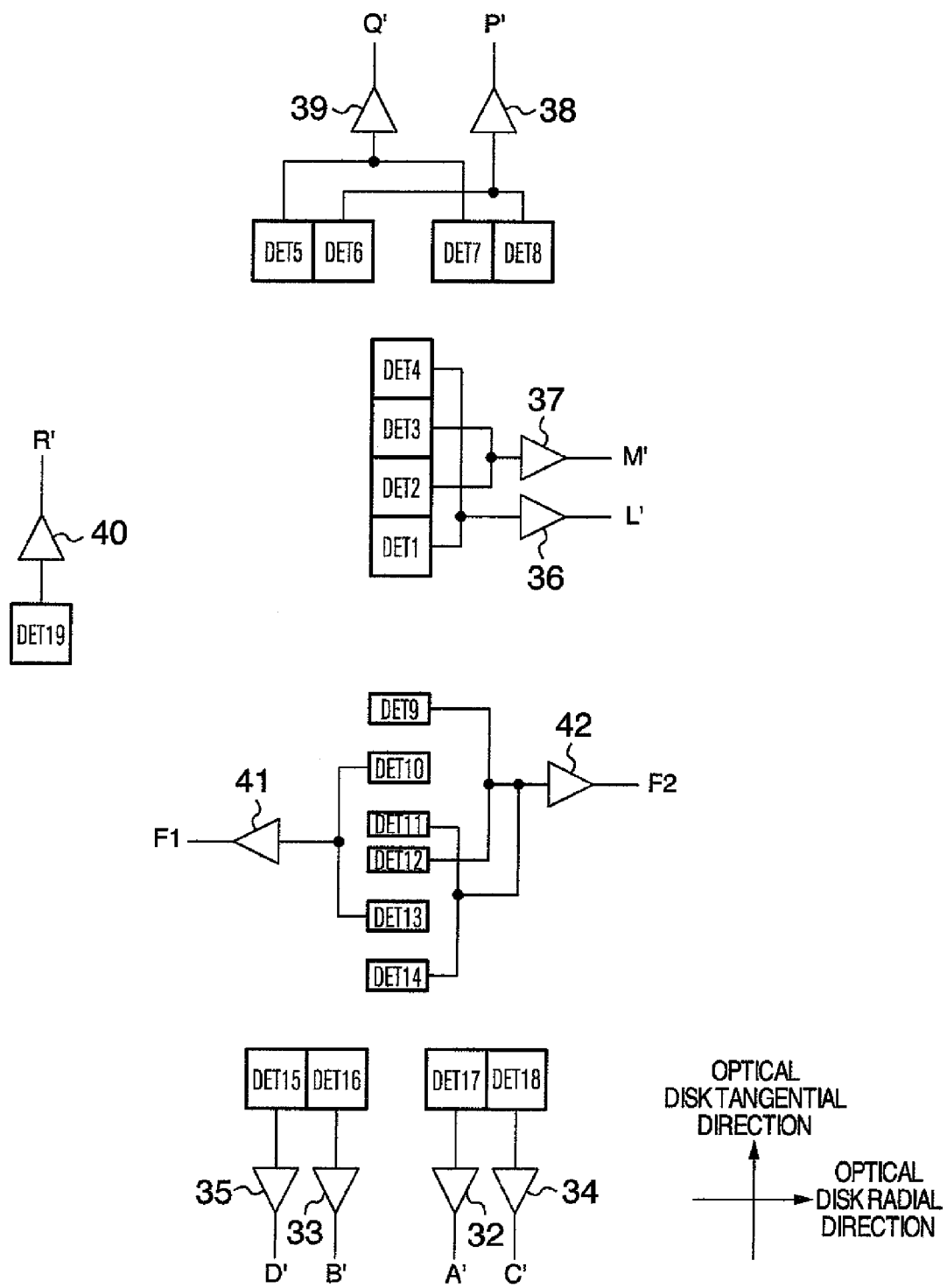
FIG. 8 is a schematic view showing a construction of an optical detector in a third embodiment.

FIG. 8 is a schematic diagram showing the construction of the optical detector 11 of this invention. Of the beams that have passed through the diffraction areas a, b, c, d, e, f, g, h, i, the +1st order light enters the light receiving areas DET1, 4, 2, 3, 8, 6, 7, 5, 19 respectively. Of the beams that have passed through the diffraction areas e, f, g, h, −1st order light enters the light receiving areas DET15, 17, 16, 18 respectively. The −1st order light of beams that have passed through the diffraction areas a, b, c, d enters the light receiving areas DET9 to DET14 for focus detection. It is noted, however, that since the detection of the focus error signal should desirably use the double knife edge method, the beams do not enter directly into the light receiving areas DET9 to DET14 but instead fall between them.

Signals are determined by the following calculations,

A signal output from DET17 through a current-voltage conversion amplifier 32 is taken as A';

a signal output from DET16 through a current-voltage conversion amplifier 33 is taken as B';

a signal output from DET18 through a current-voltage conversion amplifier 34 is taken as C';

a signal output from DET15 through a current-voltage conversion amplifier 35 is taken as D';

a signal produced by internally connecting DET1 and DET4 and output through a current-voltage conversion amplifier 36 is taken as L';

a signal produced by internally connecting DET2 and DET3 and output through a current-voltage conversion amplifier 37 is taken as M';

a signal produced by internally connecting DET6 and DET8 and output through a current-voltage conversion amplifier 38 is taken as P';

a signal produced by internally connecting DET5 and DET7 and output through a current-voltage conversion amplifier 39 is taken as Q';

a signal output from DET19 through a current-voltage conversion amplifier 40 is taken as R';

a signal produced by internally connecting DET10 and DET13 and output through a current-voltage conversion amplifier 41 is taken as F1'; and a signal produced by making internal connections between DET9 and DET11 and between DET12 and DET14 and output through a current-voltage conversion amplifier 42 is taken as F2'. Performing the following calculations on the output signals shown above can produce an information reproducing signal and a servo control signal.

PP signal: L'−M'

Lens error signal: P'−Q'

DPP signal: PP signal−k*lens error signal (L'−M'−k*(P'−Q'))

Focus error signal: F1'−F2'

DPD signal: (phase comparison between A' and B')+(phase comparison between C' and D')

Information reproducing signal: L'+M'+P'+Q'+R'

As described above, since the DPD signal that is taken from the peripheral regions of the beam is detected using −1st order light with a weak light intensity, the signal can be produced by making internal connections between the light receiving areas DET1 and 4, between DET2 and 3, between DET5 and 7 and between DET6 and 8, which in turns allows the number of current-voltage conversion amplifiers to be reduced to five, equivalent to the amplifier number of the conventional example.

That is, this embodiment has an advantage that because the DPD signal, that picks up the peripheral regions of the beam, is detected by using −1st order light with a weak light intensity, the number of current-voltage conversion amplifiers can be reduced, producing a high-quality information reproducing signal with less noise than in the first embodiment. Another advantage of this embodiment is its ability to significantly reduce the amplification factor of the amplifiers to around k=1.5. All these make it possible to provide an optical pickup device which is tolerant of disturbances such as multilayer stray light interferences and thus can generate high-quality recording and reproducing signals.

[Embodiment 4]

A fourth embodiment will be explained by referring to FIG. 9. This embodiment uses a beam divider which is easier to fabricate than that of the third embodiment in order to minimize variations in the mass production of beam dividers and thereby stabilize the performance of individual beam dividers, which in turn leads to an improved yield and a lower cost of the optical pickup device.

The construction of an optical system of the optical pickup device of this embodiment may, for example, be similar to the optical pickup device shown in FIG. 1. What differs from the first embodiment is the construction of the beam divider 10 and the optical detector 11. So, the construction of the optical detector 11, a main component of the fourth embodiment, will be explained by referring to FIG. 9.

In the optical system construction of the first embodiment, the diffraction grating tends to have the smallest grating pitch in the diffraction area i. When the grating pitch becomes small, a diffraction efficiency or the like easily changes due to influences of manufacturing errors. This in turn results in variations in the performance of the optical pickup device and a reduction in yield.

To deal with this problem, a rectangular grating that makes the light intensities of +1st order light and −1st order light equal is set in only the diffraction area i. The rectangular grating is much easier to manufacture than the blazed grating used in the first embodiment and thus can greatly reduce performance variations. The geometry of individual diffraction areas may be similar to that of the first embodiment.

Figure 9:
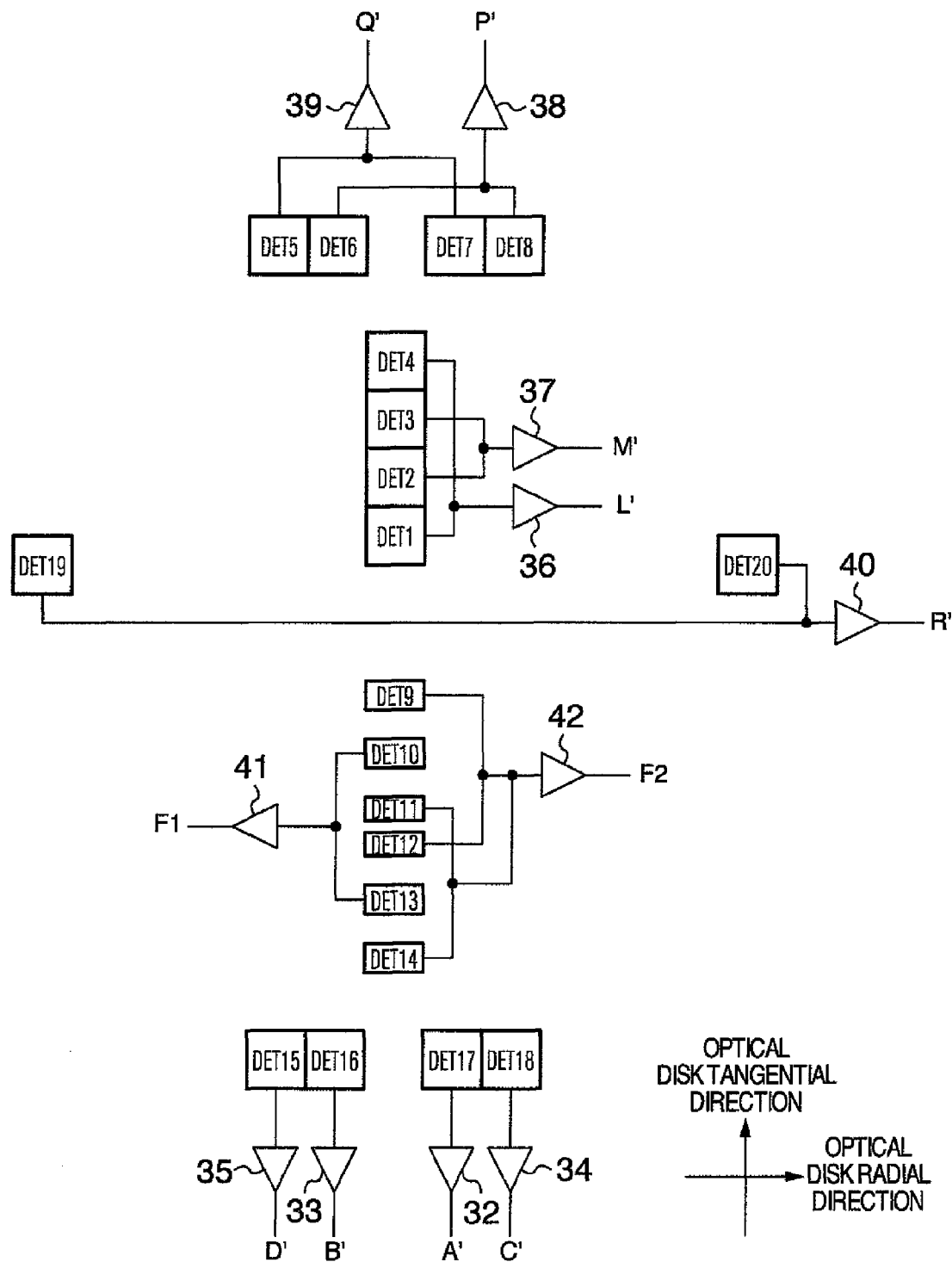
FIG. 9 is a schematic view showing a construction of an optical detector in a fourth embodiment.

FIG. 9 is a schematic diagram showing an example construction of the optical detector with its diffraction area i formed as a rectangular grating. What differs from the third embodiment is the construction of the light receiving area that receives a beam from the diffraction area i. Since the rectangular grating in the diffraction area i allots the light intensity evenly to the ±1st order light, the light intensity of +1st order light becomes smaller than that of the first embodiment. Then, an additional DET20 is provided in order to detect −1st order light from the diffraction area i, too. DET19 and DET20 may be internally connected to produce a signal R' and there will be no increase in the number of current-voltage conversion amplifiers.

The relationship between other diffraction areas and light receiving areas, their internal wire connections and the signal computation method may be similar to those of the first embodiment. More specifically, of the beams that have passed through diffraction areas a, b, c, d, e, f, g, h, the +1st order light enters DET1, 4, 2, 3, 8, 6, 7, 5 respectively. Of the beams that have passed through the diffraction areas e, f, g, h, the −1st order light enters into light receiving areas DET15, 17, 16, 18. The −1st order light of the beams that have passed through the diffraction areas a, b, c, d enters into the light receiving areas DET9 to DET14 for focus detection. However, since the double knife edge method is preferred for the detection of the focus error signal, beams do not enter directly into DET9 to DET14 but instead fall between the light receiving areas. The tracking error signal is detected by the widely used DPP method and DPD method. The +1st order light from the diffraction area i formed with the rectangular diffraction grating enters the light receiving area DET19 and the −1st order light enters the light receiving area DET20.

Signals are determined by the following calculations.

A signal output from DET17 through a current-voltage conversion amplifier 32 is taken as A';

a signal output from DET16 through a current-voltage conversion amplifier 33 is taken as B';

a signal output from DET18 through a current-voltage conversion amplifier 34 is taken as C';

a signal output from DET15 through a current-voltage conversion amplifier 35 is taken as D';

a signal produced by internally connecting DET1 and DET4 and output through a current-voltage conversion amplifier 36 is taken as L';

a signal produced by internally connecting DET2 and DET3 and output through a current-voltage conversion amplifier 37 is taken as M';

a signal produced by internally connecting DET6 and DET8 and output through a current-voltage conversion amplifier 38 is taken as P';

a signal produced by internally connecting DET5 and DET7 and output through a current-voltage conversion amplifier 39 is taken as Q';

a signal produced by internally connecting DET19 and DET20 and output through a current-voltage conversion amplifier 40 is taken R';

a signal produced by internally connecting DET10 and DET13 and output through a current-voltage conversion amplifier 41 is taken as F1'; and a signal produced by making internal connections between DET9 and DET11 and between DET12 and DET14 and output through a current-voltage conversion amplifier 42 is taken as F2'.

Performing the following calculations on the output signals shown above can produce an information reproducing signal and a servo control signal.

PP signal: L'−M'

Lens error signal: P'−Q'

DPP signal: PP signal−k*lens error signal (L'−M'−k*(P'−Q'))

Focus error signal: F1'−F2'

DPD signal: (phase comparison between A' and B')+(phase comparison between C' and D')

Information reproducing signal: L'+M'+P'+Q'+R'

That is, in this embodiment the use of the beam divider, which is easier to fabricate than that of the third embodiment, can minimize variations in mass production of the beam divider, stabilizing the performance of the individual beam dividers, improving the yield, and reducing the cost, of the optical pickup device, realizing a significant reduction of the amplification factor of the amplifiers to as low as around 1.5. This in turn offers an advantage of being able to provide an optical pickup device which is tolerant of disturbances, such as multilayer stray light interferences, has small performance variations during mass production and thus can produce stable, high-quality recording and reproducing signals.

[Embodiment 5]

Figure 10:
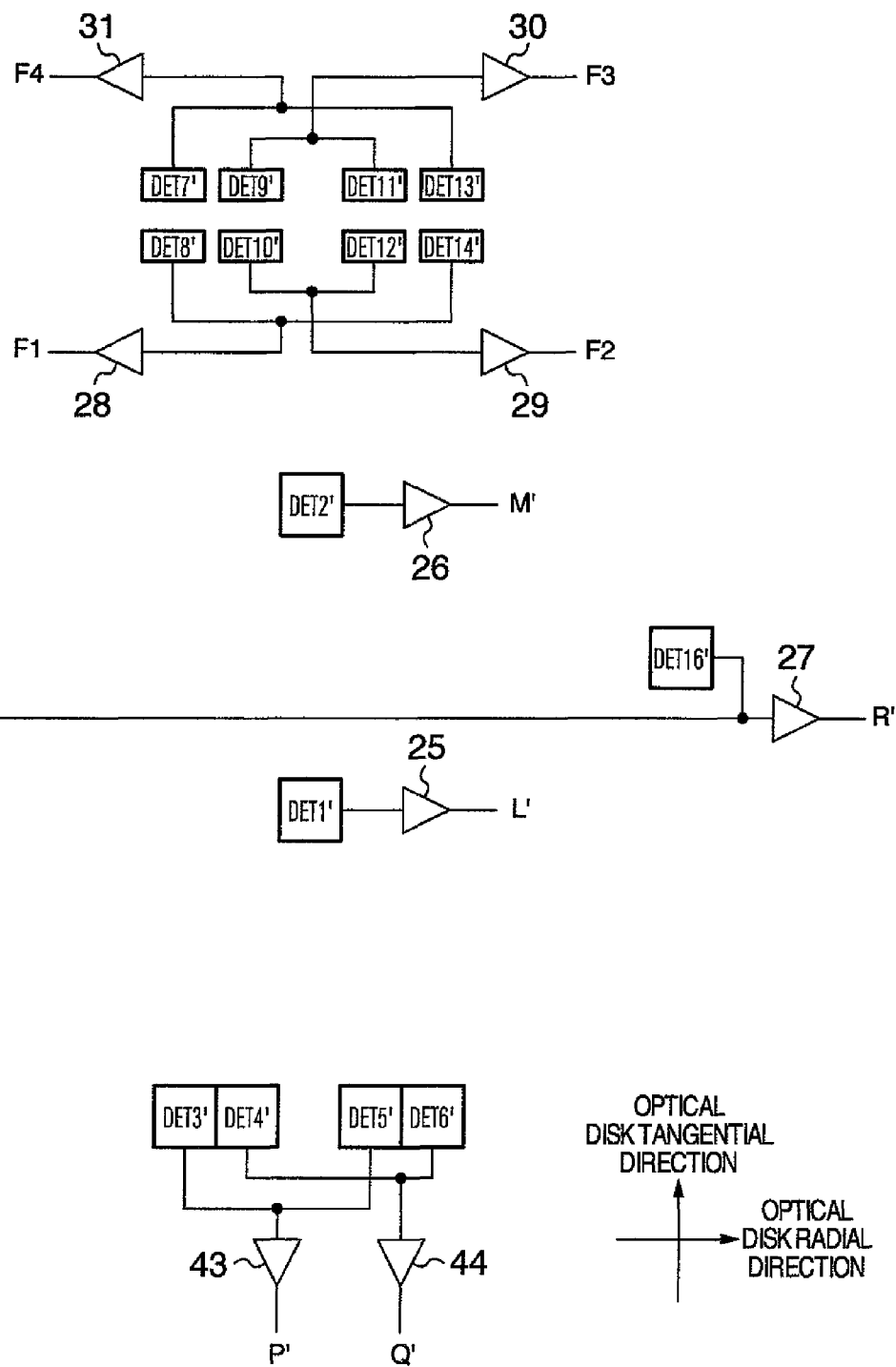
FIG. 10 is a schematic view showing a construction of an optical detector in a fifth embodiment.

Next, a fifth embodiment will be explained by referring to FIG. 10. This embodiment provides an optical pickup device which has a smaller number of current-voltage conversion amplifiers for information reproducing signal detection than that of the first embodiment and thus can produce a high-quality information reproducing signal with less noise.

The construction of an optical system of the optical pickup device of this embodiment may, for example, be similar to the optical pickup device of the first embodiment shown in FIG. 1. What differs from the first embodiment is the construction of the optical detector 11. So, the construction of the optical detector 11, a main component of the fifth embodiment, is shown in FIG. 10. The DPD signal employs a tracking error signal detection method that assumes the use of a ROM disk. The DPD signal detects a phase difference between light intensity changes. This is because the light intensity changes are brought about by the recording pits formed in the ROM disk. However, in the Blu-ray disk (or BD), for example, the ROM disk also supports the DPP method, so the DPD signal does not necessarily need to be detected. Therefore, the optical pickup device of this embodiment seeks to reduce the number of current-voltage conversion amplifiers and also reduce noise components in the information reproducing signal by not performing the DPD signal detection itself but by detecting a tracking error signal of DPP method also in ROM disks to further increase the internal wire connections in the light receiving areas. The beam divider may have the similar construction to those of the first and second embodiment. The arrangement of the light receiving areas in the optical detector may also be similar to those of the first and second embodiment. What differs from the first and second embodiment is the method of internal wire connections from the light receiving areas DET3'-DET6' up to the current-voltage conversion amplifiers 43-44. FIG. 10 shows an example light receiving area pattern with the diffraction area i formed as a rectangular grating.

A signal produced by internally connecting DET3' and DET5' and output through a current-voltage conversion amplifier 43 is taken as P'; and a signal produced by internally connecting DET4' and DET6' and output through a current-voltage conversion amplifier 44 is taken as Q'.

The lens error signal is produced by performing the calculation of (P' Q'), and the information reproducing signal is produced by (L'+M'+P'+Q'+R'). Other internal wire connections and signal calculation method may be similar to those of the first and second embodiment.

With the above construction the number of current-voltage conversion amplifiers affecting the information reproducing signal can be reduced from seven to five. This provides the fifth embodiment with an advantage of being able to produce a high-quality information reproducing signal with less noise than in the first embodiment.

[Embodiment 6]

Figure 11:
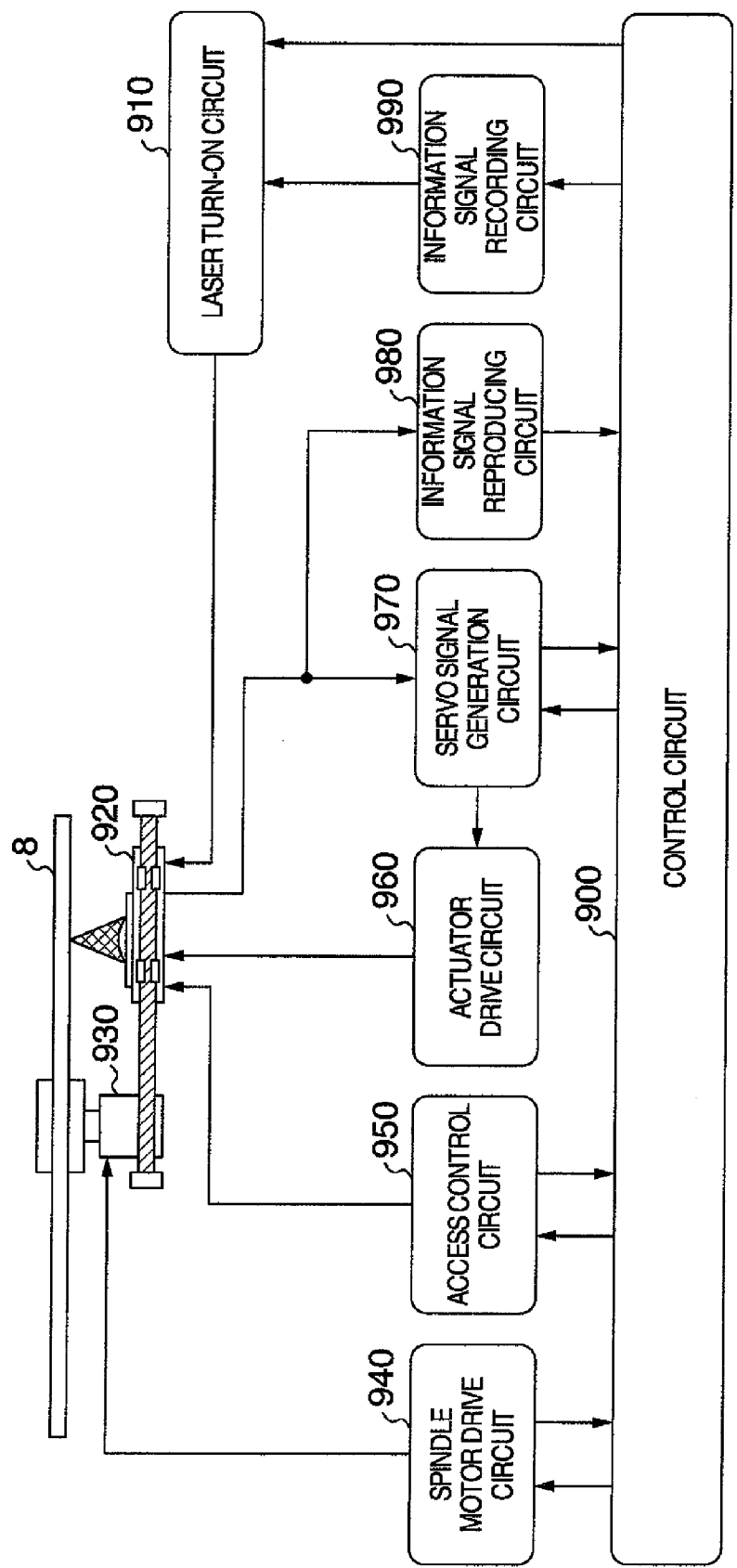
FIG. 11 is a schematic diagram showing an example construction of an optical disk device of the invention.

FIG. 11 is a schematic diagram showing an optical disk device mounting the optical pickup device of the first to fifth embodiment. Designated 8 is an optical disk, 910 a laser turn-on circuit, 920 an optical pick up, 930 a spindle motor, 940 a spindle motor drive circuit, 950 an access control circuit, 960 an actuator drive circuit, 970 a servo signal generation circuit, 980 an information signal reproducing signal, 990 an information signal recording circuit, and 900 a control circuit. The control circuit 900, the servo signal generation circuit 970 and the actuator drive circuit 960 together control an actuator according to the output from the optical pickup device 920. By using the output from the optical pickup device of this invention for the actuator control, a stable, highly precise information recording and reproducing can be performed.

The optical pickup device applying the invention is not limited to the optical system of FIG. 1 or to the optical system configuration or the light receiving area construction described in the embodiments.

The use of the units described above ensures a satisfactory reproducing quality when recording or playing back a multi-layered optical disk.

The embodiments of the optical pickup device and the optical disk device using it according to this invention have been described. It is noted that the invention is not limited to these embodiments and that various modifications and changes may be made without departing from the spirit of this invention. That is, the above embodiments have provided detailed explanations only for the understanding of this invention and do not necessarily include all of the constitutional elements of the invention. One part of the construction of one embodiment may be used in place of some part of another embodiment. It is also possible to add some construction of one embodiment to the construction of another embodiment. Further, a part of the construction of one embodiment may be added to, removed from or replaced with the construction of another embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. An optical pickup device comprising:
a laser beam source;
an object lens to focus a laser beam emitted from the laser beam source onto an optical disk;
a beam divider to divide a signal beam reflected by the optical disk into a plurality of beams; and
an optical detector having a plurality of light receiving areas which receive the divided signal beams respectively;
wherein, of the signal beams divided by the beam divider, peripheral beams removed of a push-pull signal region are detected by the optical detector;
wherein a detection signal from the peripheral beams is used to detect a differential phase detection (DPD) signal as a tracking error signal;
wherein the beam divider has at least seven diffraction areas;
wherein, of disk-diffracted beams diffracted by track grooves formed in a recording layer of the optical disk:
0-th order disk-diffracted light including a center of the beam enters into a first diffraction area,
0-th order and +1st order disk-diffracted light enter into a second diffraction area,
0-th order and −1st order disk-diffracted light enter into a third diffraction area,
peripheral regions of the 0-th order disk-diffracted light beam enter into fourth and fifth diffraction areas adjoining the second diffraction area,
peripheral regions of the 0-th order disk-diffracted light beam enter into sixth and seventh diffraction areas adjoining the third diffraction area,
the fourth and the sixth diffraction area adjoin each other, and
the fifth and the seventh diffraction area also adjoin each other;
wherein a push-pull signal is detected from the 1st order light of whichever sign has a stronger light intensity in the second and third diffraction area of the beam divider;
wherein a lens error signal proportional to a distance that the object lens has moved and the differential phase detection signal (DPD) are detected from the 1st order light of whichever sign has a stronger light intensity in the fourth to the seventh diffraction areas;
wherein 1st order light with a sign of the stronger light intensity from the fourth to the seventh diffraction areas is detected at separate light receiving areas of the plurality of light receiving areas, and detection signals at said separate light receiving areas are output independently from the detection signals at other light receiving areas, respectively; and
wherein a focus error signal is detected from the first order light of whichever sign has a weaker light intensity in the fourth to the seventh diffraction area.

2. The optical pickup device according to claim 1,
wherein the beam divider is a diffraction grating and a surface of the diffraction grating is divided into a plurality of areas, each of which is provided with a different diffraction grating groove shape;

wherein the diffraction grating of the beam divider is blazed so that a light intensity of +1st order light and a light intensity of −1st order light differ.

3. The optical pickup device according to claim 2, wherein an information reproducing signal is detected from the first order light of whichever sign has a stronger light intensity in the first to the seventh diffraction area.

4. The optical pickup device according to claim 2, wherein a push-pull signal is detected from the 1st order light of whichever sign has a stronger light intensity in the second and third diffraction area of the beam divider;
wherein a lens error signal is detected from the 1st order light of whichever sign has a stronger light intensity in the fourth to the seventh diffraction area;
wherein a differential phase detection (DPD) signal is detected from the first order light of whichever sign has a weaker light intensity in the fourth to the seventh diffraction area;
wherein a focus error signal is detected from the first order light of whichever sign has a weaker light intensity in the second and the third diffraction area;
wherein an information reproducing signal is detected from the first order light of whichever sign has a stronger light intensity in the first to the seventh diffraction area.

5. The optical pickup device according to claim 1, wherein the diffraction grating of the beam divider has intermingled therein diffraction grating areas so blazed that a light intensity of +1st order light and a light intensity of −1st order light differ and rectangular diffraction grating areas that make the light intensity of +1st order light and the light intensity of −1st order light equal.

6. The optical pickup device according to claim 5, wherein a push-pull signal is detected from the 1st order light of whichever sign has a stronger light intensity in the second and third diffraction area of the beam divider;
wherein a lens error signal and the differential phase detection (DPD) signal are detected from the 1st order light of whichever sign has a stronger light intensity in the fourth to the seventh diffraction area;
wherein a focus error signal is detected from the first order light of whichever sign has a weaker light intensity in the fourth to the seventh diffraction area;
wherein an information reproducing signal is detected from the first order light of whichever sign has a stronger light intensity in the second to the seventh diffraction area and from ±1st order light in the first diffraction area.

7. The optical pickup device according to claim 5, wherein a push-pull signal is detected from the 1st order light of whichever sign has a stronger light intensity in the second and third diffraction area of the beam divider;
wherein a lens error signal is detected from the 1st order light of whichever sign has a stronger light intensity in the fourth to the seventh diffraction area;
wherein a differential phase detection (DPD) signal is detected from the first order light of whichever sign has a weaker light intensity in the fourth to the seventh diffraction area;
wherein a focus error signal is detected from the first order light of whichever sign has a weaker light intensity in the second and the third diffraction area;
wherein an information reproducing signal is detected from the first order light of whichever sign has a stronger light intensity in the first to the seventh diffraction area and from ±1st order light in the first diffraction area.

8. The optical pickup device according to claim 1, wherein two or more light receiving areas that detect +1st order grating-diffracted light or −1st order grating-diffracted light from the fourth to seventh diffraction area are arrayed almost in line in a direction that nearly matches a radial direction of the optical disk;
wherein two or more light receiving areas that detect +1st order grating-diffracted light or −1st order grating-diffracted light from the second and the third diffraction area are arrayed in a direction that nearly matches a tangential direction of the optical disk;
wherein, when a focus is on a target recording layer of the optical disk, beams reflected from the target recording layer and passing through the first to seventh diffraction area are focused on the light receiving areas of the optical detector and beams reflected from recording/reproducing layers other than the target information recording layer and passing through the second through seventh diffraction area are not thrown onto the light receiving areas of the optical detector.

9. The optical pickup device according to claim 1, wherein a signal amplification factor of a lens error signal required for generating a differential push-pull signal as the tracking error signal is in a range of 1 to 2.

10. The optical pickup device according to claim 1, further comprising:
means for reproducing information signals recorded in a plurality of recording layers provided in the optical disk at a predetermined intervals; and
means for recording information signals in the recording layers.

11. An optical disk device comprising:
the optical pickup device claimed in claim 1;
a laser turn-on circuit to drive the laser beam source in the optical pickup device;
a servo signal generation circuit to generate a focus error signal and a tracking error signal by using a signal detected by the optical detector in the optical pickup device; and
an information signal reproducing circuit to reproducing information signals recorded in the optical disk.

12. The optical disk device according to claim 11, further comprising:
means for reproducing information signals recorded in a plurality of recording layers provided in the optical disk at a predetermined intervals; and
means for recording information signals in the recording layers.

13. The optical disk device according to claim 1, wherein the beam divider is a diffraction grating and a surface of the diffraction grating is divided into a plurality of areas, each of which is provided with a different diffraction grating groove shape.

* * * * *